US008271385B2

(12) United States Patent
Emerson et al.

(10) Patent No.: US 8,271,385 B2
(45) Date of Patent: *Sep. 18, 2012

(54) METHOD, DEVICE, AND SYSTEM FOR COMPLETING ON-LINE FINANCIAL TRANSACTIONS

(75) Inventors: Kenneth James Emerson, Toronto (CA); Edward Vincent O'Meara, Toronto (CA); Qun Chen, Toronto (CA)

(73) Assignee: Mazooma Technical Services, Inc., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,686

(22) Filed: May 17, 2010

(65) Prior Publication Data
US 2010/0223152 A1    Sep. 2, 2010

Related U.S. Application Data

(62) Division of application No. 12/024,581, filed on Feb. 1, 2008, now Pat. No. 7,720,764.

(51) Int. Cl.
*G06Q 40/00* (2006.01)
(52) U.S. Cl. ............... 705/44; 705/4; 705/14; 705/17; 705/30; 705/35; 705/37; 705/39; 705/40; 705/64; 705/74; 705/75; 713/187; 709/224
(58) Field of Classification Search ............... 705/4, 14, 705/17, 30, 35, 37, 39, 40, 64, 74, 75; 713/187; 709/224
See application file for complete search history.

(56) References Cited

U.S. PATENT DOCUMENTS

| 5,484,988 | A | 1/1996 | Hills et al. |
| 5,974,146 | A | 10/1999 | Randle et al. |
| 6,173,272 | B1 | 1/2001 | Thomas et al. |
| 7,103,579 | B1 | 9/2006 | Phillips et al. |
| 7,146,338 | B2 | 12/2006 | Kight et al. |
| 7,165,052 | B2 | 1/2007 | Diveley |
| 7,177,836 | B1 | 2/2007 | German et al. |

(Continued)

FOREIGN PATENT DOCUMENTS
WO    2006113834 A2    10/2006

OTHER PUBLICATIONS 4 pages, "Safewww Launches Fraudnet to Thwart Repeat Offenders of Online Fraud", Business Wire, Mar. 2002.*

*Primary Examiner* — James P Trammell
*Assistant Examiner* — Sanjeev Malhotra
(74) *Attorney, Agent, or Firm* — The Smiley IP Law Group, P.A.; Scott D. Smiley; Mark C. Johnson

(57) ABSTRACT

A method for conducting a secure transaction over a network includes the steps of receiving a price and a transaction identifier from a merchant, the transaction identifier identifying a purchase selection made by a user, receiving a user identifier from a user, receiving a financial institution selection from the user, initiating a communication session with the selected financial institution, receiving a financial-institution user-identifier from the user, communicating the financial-institution user-identifier to the selected financial institution, communicating to the selected financial institution a request to transfer funds, receiving the funds from the selected financial institution, and sending the funds to the merchant.

20 Claims, 10 Drawing Sheets

U.S. PATENT DOCUMENTS

| | | | |
|---|---|---|---|
| 7,184,989 B2 | 2/2007 | Hansen et al. | |
| 7,213,003 B1 | 5/2007 | Kight et al. | |
| 7,249,093 B1 | 7/2007 | King et al. | |
| 7,290,704 B1 | 11/2007 | Ball et al. | |
| 7,318,049 B2 | 1/2008 | Iannacci | |
| 2002/0032653 A1* | 3/2002 | Schutzer | 705/40 |
| 2002/0052853 A1 | 5/2002 | Munoz | |
| 2002/0077978 A1 | 6/2002 | O'Leary et al. | |
| 2002/0087465 A1* | 7/2002 | Ganesan et al. | 705/39 |
| 2002/0095377 A1 | 7/2002 | Likourezos et al. | |
| 2002/0103756 A1 | 8/2002 | Andrews et al. | |
| 2002/0107767 A1* | 8/2002 | McClair et al. | 705/35 |
| 2003/0018554 A1* | 1/2003 | Lyftogt et al. | 705/35 |
| 2003/0065563 A1* | 4/2003 | Elliott et al. | 705/14 |
| 2003/0070080 A1* | 4/2003 | Rosen | 713/187 |
| 2003/0105725 A1* | 6/2003 | Hoffman | 705/75 |
| 2003/0126075 A1 | 7/2003 | Mascavage, III et al. | |
| 2003/0140004 A1 | 7/2003 | O'Leary et al. | |
| 2003/0187791 A1 | 10/2003 | Weichert et al. | |
| 2003/0212632 A1 | 11/2003 | Keogh et al. | |
| 2003/0220884 A1* | 11/2003 | Choi et al. | 705/64 |
| 2004/0083184 A1* | 4/2004 | Tsuei et al. | 705/74 |
| 2004/0093277 A1 | 5/2004 | Faerch et al. | |
| 2004/0098350 A1* | 5/2004 | Labrou et al. | 705/64 |
| 2004/0148258 A1 | 7/2004 | Tillett | |
| 2004/0153398 A1* | 8/2004 | Baumgartner et al. | 705/39 |
| 2004/0158522 A1 | 8/2004 | Brown et al. | |
| 2004/0210521 A1 | 10/2004 | Crea et al. | |
| 2006/0036544 A1* | 2/2006 | Dharam | 705/40 |
| 2006/0095350 A1* | 5/2006 | Hall et al. | 705/30 |
| 2006/0143124 A1 | 6/2006 | Ehrke | |
| 2006/0212391 A1* | 9/2006 | Norman et al. | 705/40 |
| 2006/0224508 A1 | 10/2006 | Fietz | |
| 2006/0242058 A1 | 10/2006 | Torto | |
| 2007/0100770 A1 | 5/2007 | Grinberg et al. | |
| 2007/0136180 A1* | 6/2007 | Salomon et al. | 705/37 |
| 2007/0136191 A1 | 6/2007 | Itwaru | |
| 2007/0162387 A1 | 7/2007 | Cataline et al. | |
| 2007/0174448 A1* | 7/2007 | Ahuja et al. | 709/224 |
| 2007/0255644 A1* | 11/2007 | Elder | 705/37 |
| 2007/0299699 A1* | 12/2007 | Policelli et al. | 705/4 |
| 2008/0046362 A1* | 2/2008 | Easterly | 705/40 |
| 2008/0249911 A1* | 10/2008 | Chan et al. | 705/35 |
| 2008/0288358 A1* | 11/2008 | Hall et al. | 705/17 |
| 2008/0313047 A1* | 12/2008 | Casares et al. | 705/17 |

\* cited by examiner

200

FIG. 4 eMerchant Demo

Your Purchase  Pay To: eMerchant Demo
Amount: $ 1.25 USD

Choose your bank:  Bank ABC ▼ — 502

[button] — 504

Your bank not on the list? *click to download*

*click download*

Thank You

Your purchase is complete and you are signed out of Bank ABC online banking.

```
              Your Receipt

Name:              John Smith
Email:             tech@mazooma.com
Merchant:          eMerchant Demo
Amount:            $ 1.26 USD
Date/Time:         Nov 09, 2007 10:52
Mazooma Purchase #:  20071109185322421127000000
Bank Name:         Bank ABC
Bank Confirmation #: 000000145
```

METHOD, DEVICE, AND SYSTEM FOR COMPLETING ON-LINE FINANCIAL TRANSACTIONS

CROSS-REFERENCE TO RELATED APPLICATIONS

This application is a divisional application claiming priority of U.S. patent application Ser. No. 12/024,581 filed Feb. 1, 2008, the entirety of which is incorporated by reference.

FIELD OF THE INVENTION

The present invention relates generally to on-line economic transactions, and, in particular, to a method, device, and system that facilitates electronic fund transfers, initiated at a merchant site, from a consumer's financial institution to the merchant.

BACKGROUND OF THE INVENTION

Purchases of goods and services over the internet have transformed from what was once a novel way of conducting a business transaction to a now well-known mainstream method of acquiring those goods and services. These "on-line" transactions include making a selection from an offering at a merchant's website, entering payment information, and concluding the transaction by authorizing the merchant to receive funds. Presently, there are several methods by which a consumer can electronically pay for the purchases made on the Internet, which are, namely, credit cards, debit cards, direct debit, and electronic funds transfers. Each of these methods, however, has its own advantages and disadvantages.

When making an on-line purchase with a credit card, the consumer provides the merchant with credit card information sufficient to process the transaction. The information can include the credit card number, a security code referred to as CVV2, the card holder's address, the card's expiration date, and more. The amount of the purchase is then charged to the associated credit card account. However, credit cards are susceptible to fraud, especially when used over the Internet, because the physical card is never presented to the merchant, allowing anyone with the credit-card information to initiate a transaction. In addition, a verification to check whether the credit card owner has in fact authorized the purchase is typically not performed during on-line purchases. This lack of security makes many purchasers reluctant to use a credit card over the Internet. In addition, credit cards have a relatively high cost to the merchant that includes a processing fee of 1.4% and up. Credit cards also present a potentially high cost to the consumer, as credit card issuer's charge interest on any balance that is not paid by the end of a billing cycle.

Debit cards can be used to make purchases on-line. Debit cards are really "signature" based check cards that are associated with a bank account. They are analogous to a check with insufficient funds (NSF) and overdraft protection. A consumer can initiate the on-line purchase by supplying his or her account number and generally one other piece of information, such as a three or four digit number stamped on the physical card, and the amount of the purchase is debited directly from the consumer's account. One major disadvantage of debit cards, from a consumer's point of view, is the inability to immediately reverse or repudiate the transaction. Once the funds are withdrawn from the consumer's account, he or she will be forced to do without those funds during any dispute procedures. Interception of the account number and other piece of information, such as the three or four digit number stamped on the physical card allows a third party direct access to a consumer's funds. This possibility makes many consumers reluctant to use debit cards over the internet. In addition, debit cards have a relatively high cost to the merchant that includes a processing fee of 1.4% and up. The debit or check cards have the same disadvantages as credit card since they operate much the same—same networks and same authentication. Therefore security is a major drawback. Also, fees for overdrafts are high.

Fund transfer methods of payment for on-line purchases are also known. Fund transfer methods include payment employing an intermediate account whereby a consumer transfers funds from his personal financial-institution account into the intermediate account and then uses the funds in the intermediate account in making an on-line purchase. These systems include electronic wallets (or ewallets), internet pay anyone (IPA) accounts and virtual or physical pre-paid credit cards. When paying for an on-line purchase from an intermediate account the consumer may be required to provide the merchant with information identifying his intermediate account such as a user identifier (User ID) and a password.

If the consumer does not have sufficient funds in the intermediate account, the on-line transaction will be denied. Funding an intermediate account requires the consumer to plan ahead; it may take one to five business days before a consumer who has transferred funds into his intermediate account to access those funds. During this time, the funds are debited from the consumer's personal financial-institution account and the consumer disadvantageously does not have access to these funds. On the other side, the intermediate account provider will place a hold on deposited funds until they are cleared. A consumer who does not have enough funds in his intermediate account to pay for his on-line purchase will have to wait for the funds to clear before he can complete his purchase.

Consumer pre-authorized direct debit methods are known and typically used for on-line payment of bills, such as utility bills, and for recurring payments. However, a merchant needs prior standing authority from the consumer. Without this explicit authority no third parties, such as merchants, are able to access funds from the customer. Such an arrangement is tedious and inconvenient to set up. In any event, customers are extremely reluctant to give authority to a third party to access their funds and there are concerns about fraud and difficulty in canceling such authority.

Customer initiated electronic checks (echecks) are known and can be used for on-line purchases. Typically the customer provides his routing and account number and the merchant or processor debits funds from the consumer's account through the check clearing network. The problems with this method include the lack of any real time verification of account ownership, authorization, or sufficient funds, and a lack of a real time settlement system. In addition, there is no built in identity verification or notification of transaction success.

Therefore a need exists to overcome the problems with the prior art as discussed above.

SUMMARY OF THE INVENTION

The present invention provides a method for conducting a secure transaction over a network, where the method includes receiving a price and a transaction identifier from a merchant, the transaction identifier identifying a purchase selection made by a user, receiving a user identifier from a user, receiving a financial-institution selection from the user, initiating a communication session with the selected financial institution, receiving a financial-institution user-identifier from the user, communicating the financial-institution user-identifier to the selected financial institution, communicating to the selected financial institution a request to transfer funds, receiving the funds from the selected financial institution, and sending the funds to the merchant.

In accordance with a further feature of the present invention, initiating a communication session step is performed by an agent that automatically performs substantially all steps for electronic communication with a financial institution to gain access to an account.

In accordance with yet another feature of the present invention, the funds from the selected financial institution are received into an intermediate account.

In accordance with yet another feature, the present invention includes aggregating at least two transactions into a net settlement amount owed to the merchant, and pushing the net settlement amount from the intermediate account to the merchant.

In accordance with another feature, the present invention includes a device for conducting a secure transaction over a network, where the device includes an input operable to receive a price and a transaction identifier from a merchant, the transaction identifier identifying a purchase selection made by a user, receive a user identifier from a user, receive a financial-institution selection from the user, and receive a financial-institution user-identifier from the user. The device further includes a processor communicatively coupled to the input and operable to initiate and maintain a communication session with the selected financial institution. The device also includes an output operable to communicate the financial-institution user-identifier to the selected financial institution, communicate to the selected financial institution a request to transfer funds, and communicate to the selected financial institution an identifier of an intermediate account for receiving the funds, wherein the intermediate account is a settlement account maintained by an entity separate from the financial institution and the merchant.

The present invention, according to another embodiment, includes a method for conducting a secure transaction over a network, where the method includes receiving a purchase selection at a merchant site, communicating a transaction identifier and a purchase price from the merchant site to a debit agent, receiving at the debit agent a user identifier from a user, receiving at the debit agent a financial-institution selection from the user, initiating with the debit agent a communication session with the selected financial institution, receiving at the debit agent a financial-institution user-identifier from the user, communicating the financial-institution user-identifier from the debit agent to the selected financial institution, communicating from the debit agent to the selected financial institution a request to withdraw funds, receiving into an intermediate account the funds from the selected financial institution, and transferring with the debit agent the funds from the intermediate account to the merchant.

In accordance with an additional feature, transferring the funds to the merchant includes the steps of aggregating at least two transactions into a net settlement amount owed to the merchant and pushing the net settlement amount from the intermediate account to the merchant.

Other features that are considered as characteristic for the invention are set forth in the appended claims.

Although the invention is illustrated and described herein as embodied in a method, device, and system for completing on-line financial transactions, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 is an exemplary ODS log-in page in accordance with an embodiment of the present invention.

FIG. 5 is an exemplary ODS financial-institution selection screen in accordance with an embodiment of the present invention.

Figure 6:
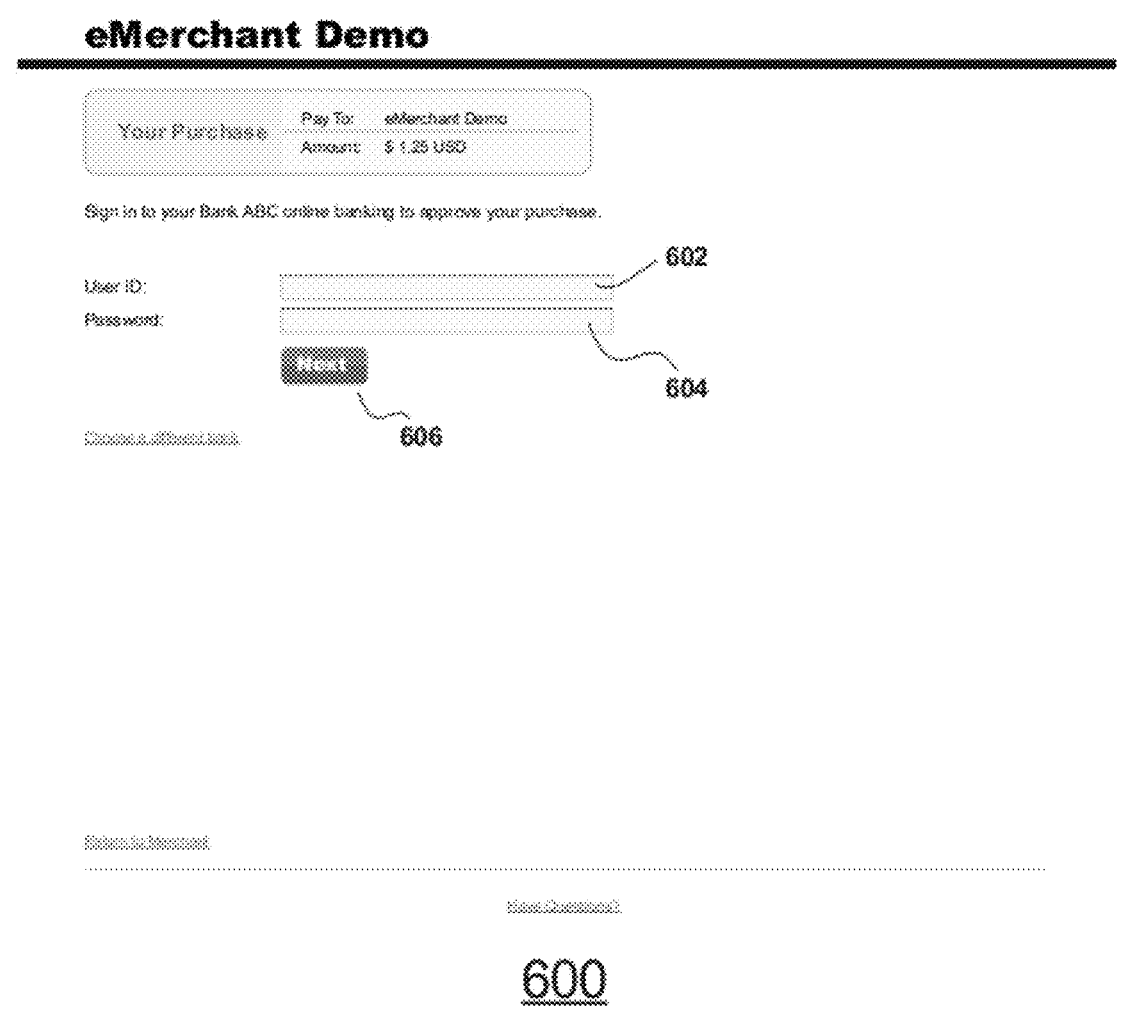

FIG. 6 is an exemplary ODS financial-institution log-in screen in accordance with an embodiment of the present invention.

FIG. 8 is an exemplary ODS confirmation screen in accordance with an embodiment of the present invention.

DETAILED DESCRIPTION

Figure 1:
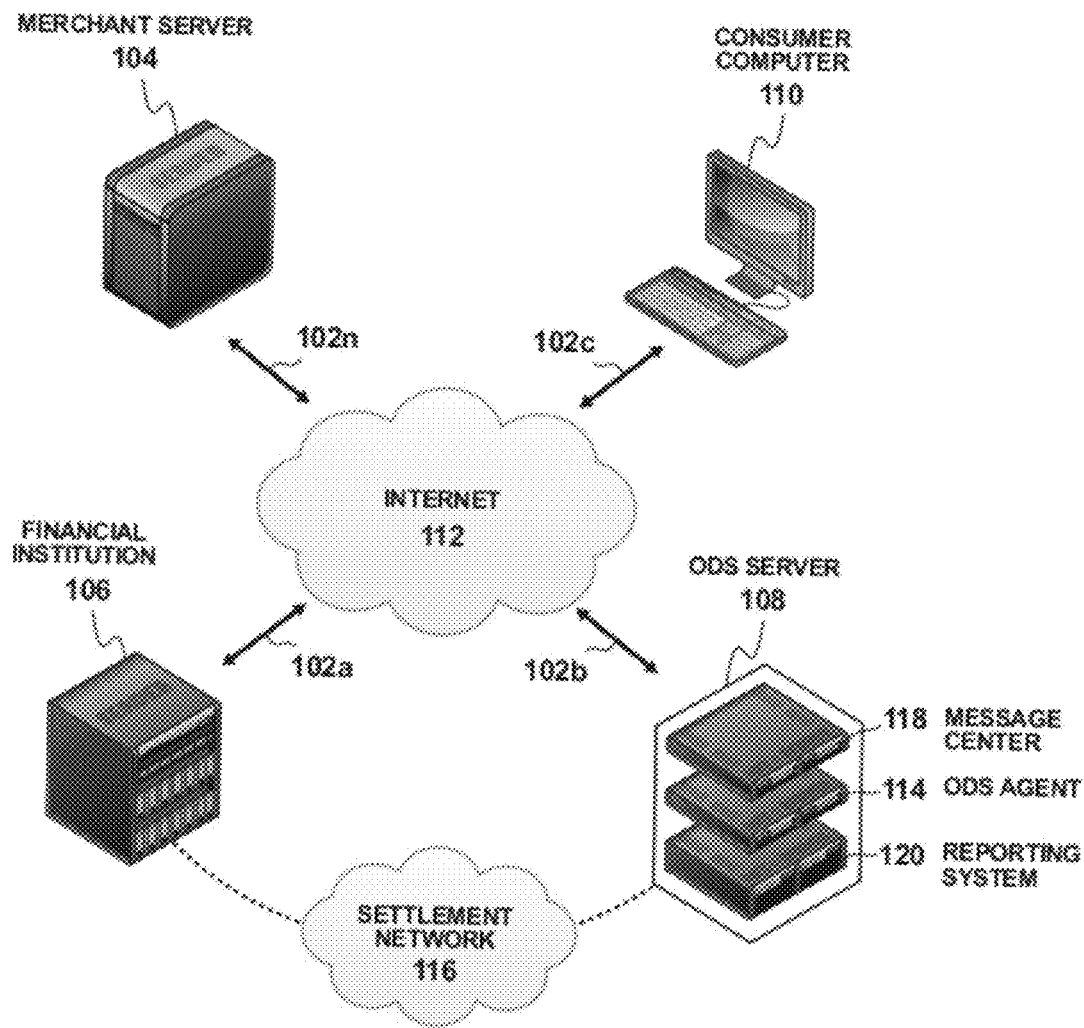
FIG. 1 illustrates an exemplary distributed data processing system in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

Described now is an exemplary device, system, and method for conducting secure direct-debit economic transactions over a network. Embodiments of the present invention allow a consumer completing a transaction on a merchant site to be seamlessly directed to an inventive server device that intelligently and securely facilitates a funds transfer from the consumer's financial institution to the merchant. The invention, according to particular embodiments, is advantageous in the respect that the consumer only provides sensitive information to a single entity that is consistent throughout all transactions, regardless of the various merchant selected.

Further advantages are realized by the closed-loop transaction structure of the present invention, where the merchant receives real-time notification of the success or failure of the transaction. Also, there is no need for the consumer to fund an intermediary account or to take on any debt during the transaction. Furthermore, the consumer does not need to have a pre-established account with ODS agent to complete the transaction—the account can be created within the transaction process. The consumer doesn't need to provide credit card or other sensitive financial information to the merchant. The consumer only provides sensitive information to a single entity that is consistent throughout all transactions, regardless of the various merchant selected. The system provides to merchants a real-time or quasi-real-time "financial institution authenticated" transaction, ensuring that the customer has access to the bank account being used.

Network

With reference now to the figures, FIG. 1 depicts a representation of a network of data processing systems in which the present invention may be implemented. The network 100 includes connections 102a-n, which are the medium used to provide communications links between various devices and computers connected together within the network 100. The connections 102a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, a merchant server 104 is connected to the network 100 along with a financial-institution server 106 and an On-line Debit System (ODS) server 108 running an ODS agent 114. In addition, a consumer 110 is also connected to or has at least temporary access to the network 100. The consumer 110 may be, for example, a personal computer or network computer or any other device that has electronic communication capabilities and is able to communicate with or over the network 100.

Network 100 may include additional servers, consumers, and other devices and entities not shown. In the depicted example, consumer 110 communicates with the merchant server 104 and, as will be explained in detail below, merchant server 104 provides data, such as listings of goods or services offered by the merchant to the consumer 110. The consumer 110 is also able to communicate over the network 100 with additional servers, consumers, and other devices and entities. Any of the depicted network entities, in addition to communication with each other over the network 100, are, in some embodiments, also able to communication in a peer-to-peer communication using wired or wireless links.

The merchant server 104 and financial institution server 106 represent a merchant and a financial institution, respectively, that operates or communicates through the merchant server 104 and financial institution server 106. Therefore, throughout the remainder of the specification, the merchant server 104 and financial institution server 106 will be referred to generally as the merchant 104 and financial institution 106.

In the depicted example, network 100 can include the Internet 112, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 100 also may be implemented as a number of different types of networks, such as for example, an intranet, a local area network (LAN), or a wide area network (WAN). FIG. 1 is intended as an example, and not as an architectural limitation for the present invention.

Server/Computer

Figure 2:
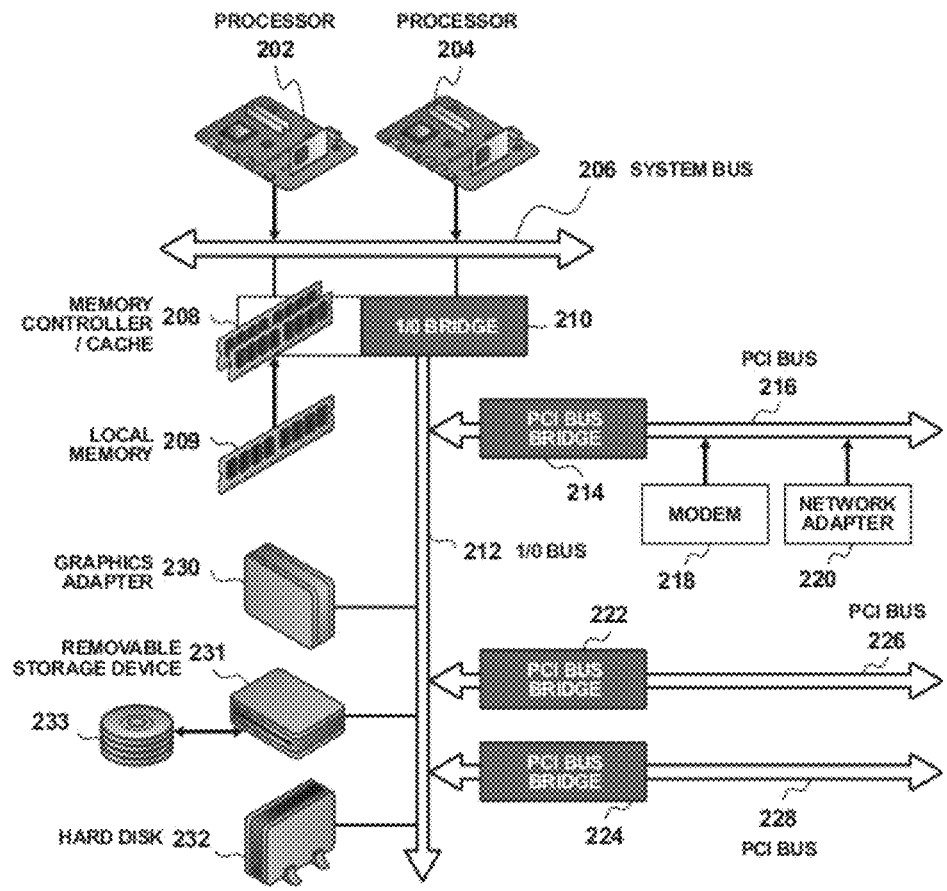
FIG. 2 is a block diagram of a data processing system that may be implemented as a network device, such as a server shown in FIG. 1, in accordance with an embodiment of the present invention.

Referring to FIG. 2, a block diagram of a data processing system that may be implemented as a server, such as server 104, 106, or 108 or implemented as a personal computer, such as consumer computer 110 in FIG. 1, is depicted in accordance with one embodiment of the present invention. Data processing system 200 may be a symmetric multiprocessor (SMP) system including a plurality of processors 202 and 204 connected to system bus 206. Alternatively, a single processor system may be employed. Also, connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. The processor 202 or 204 in conjunction with memory controller 208 controls what data is stored in memory 209. The processor 202 and/or 204 and memory controller 208 can serve as a data counter for counting the rate of data flow to the memory 209 or from the memory 209 and can also count the total volume of data accessed to or from the memory 209. The processor 202 or 204 can also work in conjunction with any other memory device or storage location.

Peripheral component interconnect (PCI) bus bridge 214 connected to I/O bus 212 provides an interface to PCI local bus 216. A number of moderns may be connected to PCI bus 216. Typical PCI bus implementations will support four PCI expansion slots or add-in connectors. Communications links to network computers in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The ODS agent 114 is explained in detail below and can be embodied in a computer program. Computer programs (also called computer control logic) are stored in memory such as main memory 209, removable storage drive 231, removable media 233, hard disk 232, and signals. Computer programs may also be received via communications interface 216. Such computer programs, when executed, enable the computer system to perform the features of the present invention as discussed herein. In particular, the computer programs, when executed, enable the processor 202 and/or 204 to perform the features of the ODS agent 114.

In this document, the terms "computer program medium," "computer usable medium," and "computer readable medium" are used to generally refer to media such as main memory 209, removable storage drive 231, removable media 233, hard disk 232, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

On-Line Transactions

The above-described hardware is useful for implementing the present invention, which accomplishes secure on-line transactions between a consumer 110 and a merchant 104 through utilization of an ODS server 108 and an ODS agent 114. An "on-line" transaction is defined herein as any transaction that occurs at least partially over any electronic communication network.

Figure 3A:
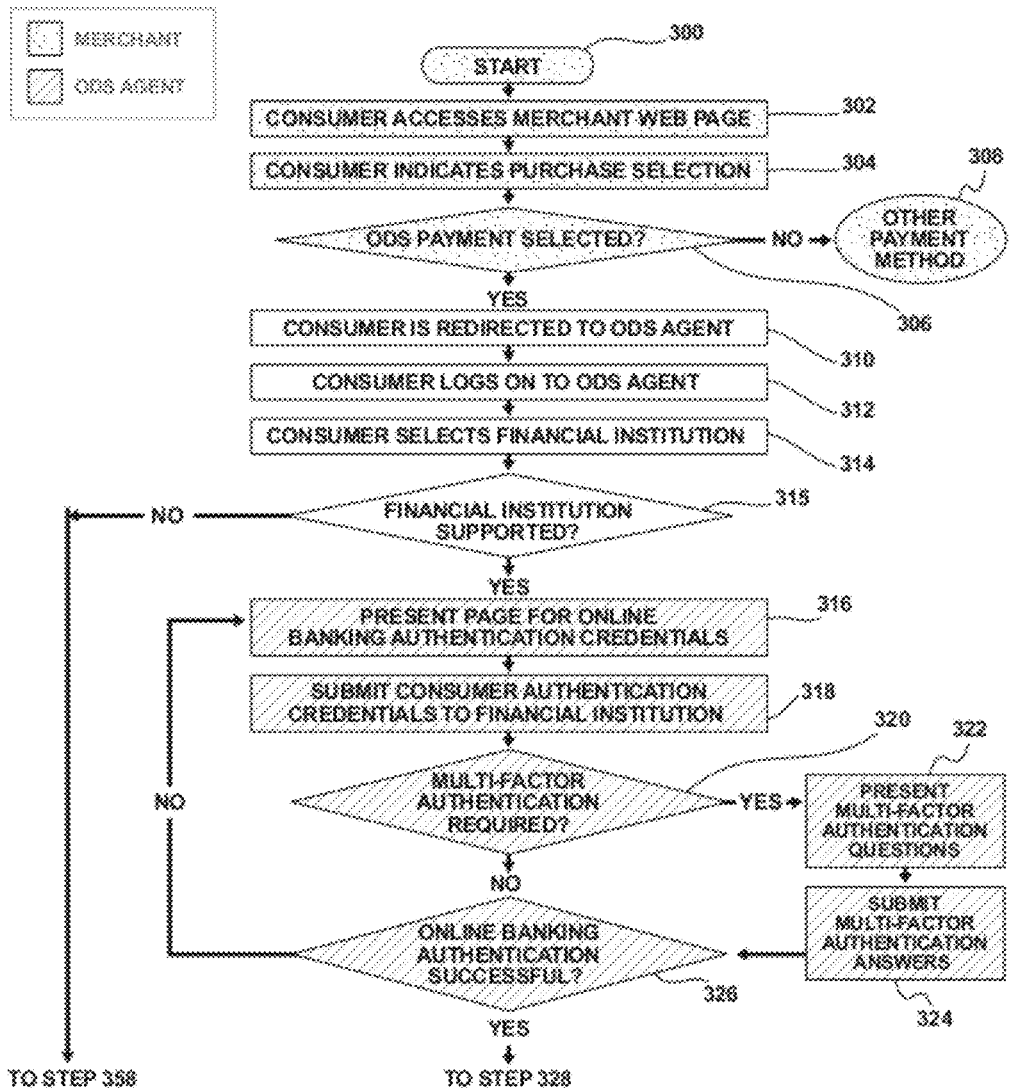
FIGS. 3a & 3b are a single process flow diagram showing a method of completing on-line financial transactions in accordance with an exemplary embodiment of the present invention.
Figure 3B:
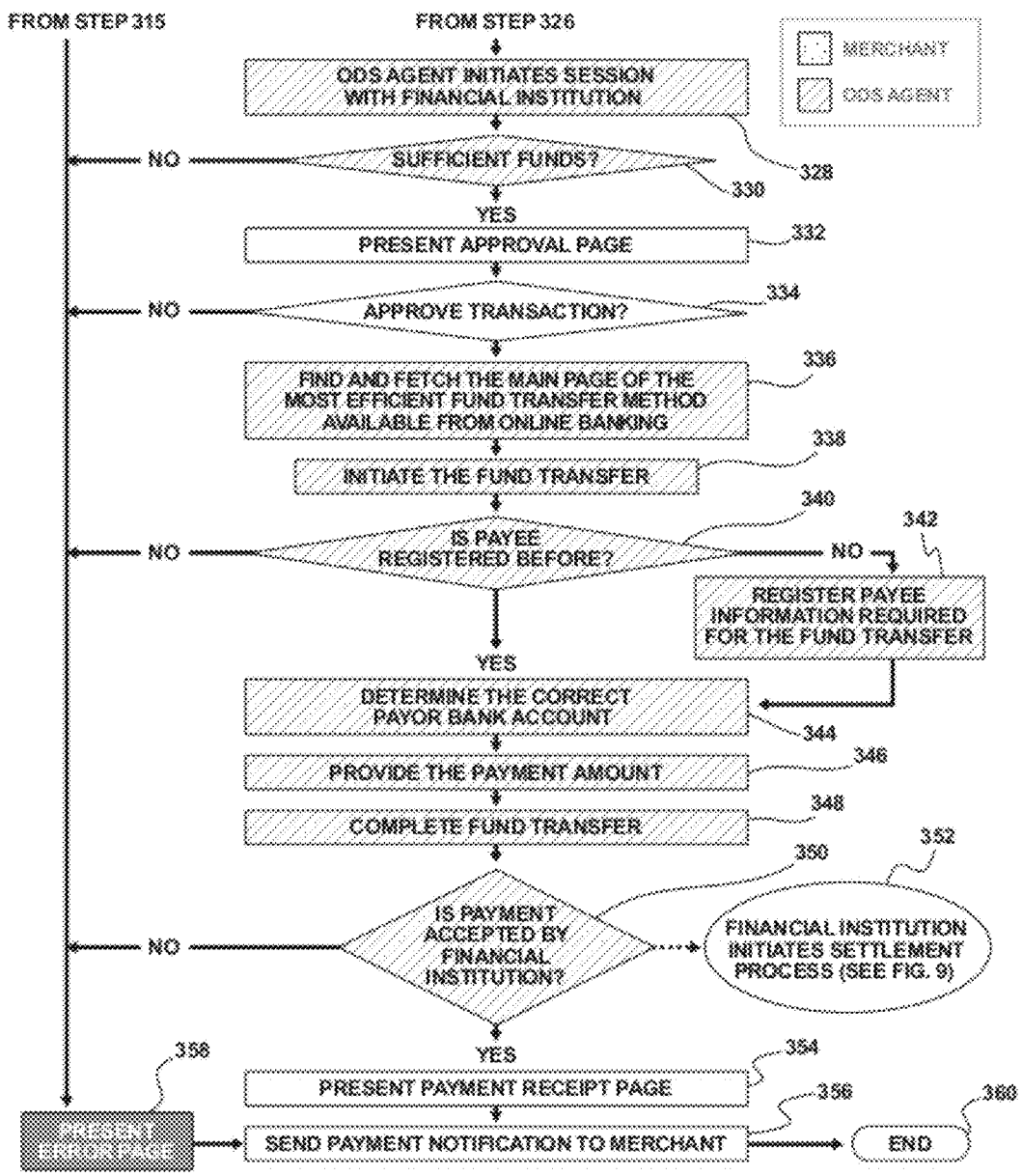

FIGS. 3a and 3b illustrate a single process flow of one embodiment of the present invention. The process flow provides exemplary steps for carrying out an exemplary embodiment of the present invention. The invention however is not limited to the number or the order of steps shown in FIGS. 3a and 3b.

The flow starts at step 300 and moves directly to step 302 where a consumer uses a consumer computer 110 to access a merchant's web page through a network, such as the internet 112. It is noted that a consumer is not shown in FIG. 1; however, for the purposes of the instant discussion, a consumer and a consumer computer are indistinguishable. Web pages are well known in the art and are a resource of information that is suitable for access over the internet 112 and can be accessed through a web browser running on a computing system, such as consumer computer 110. Web pages may consist of files of static text stored within a server's file system (static web pages), or the web server may construct the (X)HTML for each web page when it is requested by a browser (dynamic web pages). Client-side scripting can make web pages more responsive to user input once in the client browser. Web pages are requested and served from web servers using Hypertext Transfer Protocol (HTTP). This information is usually in HTML or XHTML format, and may provide navigation to other web pages via hypertext links within the page.

In step 304, the consumer uses the consumer computer 110 to indicate to the merchant server 104 a purchase selection. The selection can include a product, commodity, a service, or other that is offered by the particular merchant owning, operating, or otherwise associated with the merchant server 104. As an example, a consumer shopping for sports equipment might navigate to a webpage on the merchant server 104 hosted by a sports-equipment company. It is noted that the merchant itself does not necessarily own, host, or maintain the merchant server 104. In many cases, a merchant may utilize a web-hosting service from a third party using the third party's equipment. Once the sports-equipment web page is viewable on the consumer computer 110, the consumer selects, by mouse click or otherwise, the piece of equipment that he or she wishes to purchase.

In step 306, the merchant server 104 provides the consumer with a choice of payment options supported by the merchant. In accordance with the present invention, one of these options is an on-line debit process using the ODS server 108 and ODS agent 114. If the on-line debit process is selected by the consumer as the preferred payment method, the process flow moves to step 310 where the consumer is redirected to the ODS server 108 to complete the transaction. The ODS server 108 is a physical hardware device and the ODS agent 114 can be hardware and/or a computer program that is responsible for accepting HTTP requests from merchants and serving them HTTP responses along with optional data contents, which usually are web pages such as HTML documents and linked objects (images, etc.). In the redirection, the merchant's on-line application sends payment details, such as order number, amount, and others to the ODS server 108 and ODS agent 114.

ODS Agent

The ODS agent 114 is a programming module that provides other network components with programming interfaces to on-line banking authentication and fund transfer services through a specific financial institution. The ODS agent 114 handles HTTP communications and HTML contents intelligently to automate intermediate interactive steps required to effect an on-line fund transfer. It encapsulates such complexity from other ODS components by providing well defined programming interfaces. By implementing and utilizing ODS agents, an ODS system can thus present a universal and clean interface for consumers to transact on-line debits efficiently and securely through heterogeneous on-line banking services. In other words, once a user provides his financial institution identification information, the ODS agent 114 conducts a user-free (i.e., user's further input is not needed) communication session with the financial institution 106.

To manage the complexity for both implementation and maintenance, an agent 114 is constructed in such a way that it can automatically adapt to non-structural changes of on-line banking services while monitoring and reporting functional changes of the services so that modifications can be applied easily and accurately.

In an exemplary implementation, an ODS agent provides the following functionalities:

Programming interface for on-line banking authentication service

Programming interface for on-line fund transfer service

Mechanism for on-line banking session management

Authentication service is an integral part of on-line banking services. To comply with regulatory rules and assure the integrity of the entire system, on-line banking utilizes leading edge technologies for user authentication to address fraud and repudiation concerns. In practice, the implementation of such service varies from bank to bank. Most banks nowadays require multi-factor authentication when an unusual usage pattern is detected (for example when a user logs in from a new device for the first time). Multi-factor authentication may, on top of usual authentication credentials such as log-in and password, involve (random) Q and A (question and answer) tests from a set of questions that are preset by a consumer for on-line banking. Most banks also avoid unnecessary multi-factor authentication by maintaining a (device) token on the consumer's computer device after a successful multi-factor authentication.

The presently inventive ODS agent 114, according to an embodiment, implements on-line banking authentication. It may cache (device) tokens set by on-line banking to pass multi-factor authentication when applicable. The caching mechanism may be implemented by keeping track of the token for a specific on-line banking log-in and storing it in a database for subsequent usage.

Fund transfer services are part of on-line banking services for consumers to pay service providers (utilities etc) or other account holders (accounts in another financial institution, friends, relatives etc) conveniently and efficiently. Banks may provide one or more ways to facilitate the payments and each of them involves quite different steps or set up. Banks may add more methods with advancement in payment technology for specific bank or the banking industry as a whole.

The ODS agent 114 is able to implement the most efficient fund transfer service available from a specific bank. In particular it is able to verify the availability of sufficient funds for a particular payment to avoid inconvenience and cost arising from overdraft or insufficient funds (NSF). Also the agent 114 is able to automatically determine and select a proper bank account for the payment when multiple accounts are present for on-line banking. It encapsulates the details from other ODS components so that the payment method may be replaced by a more efficient one in the future while keeping the interface to consumers (user experience) intact.

Session management is an important part of on-line banking services. On-line banking services utilize session control to manage states of a multiple-step operation. They also apply session control to protect services or resources from unauthorized usage. The techniques may involve cookie management or URL rewriting.

According to an embodiment of the present invention, the ODS agent 114 implements session management required by on-line banking services to facilitate multi-step fund transfers. It also maintains the session after successful authentication and instructs on-line banking server to close the session once a transfer is completed.

Figure 4:
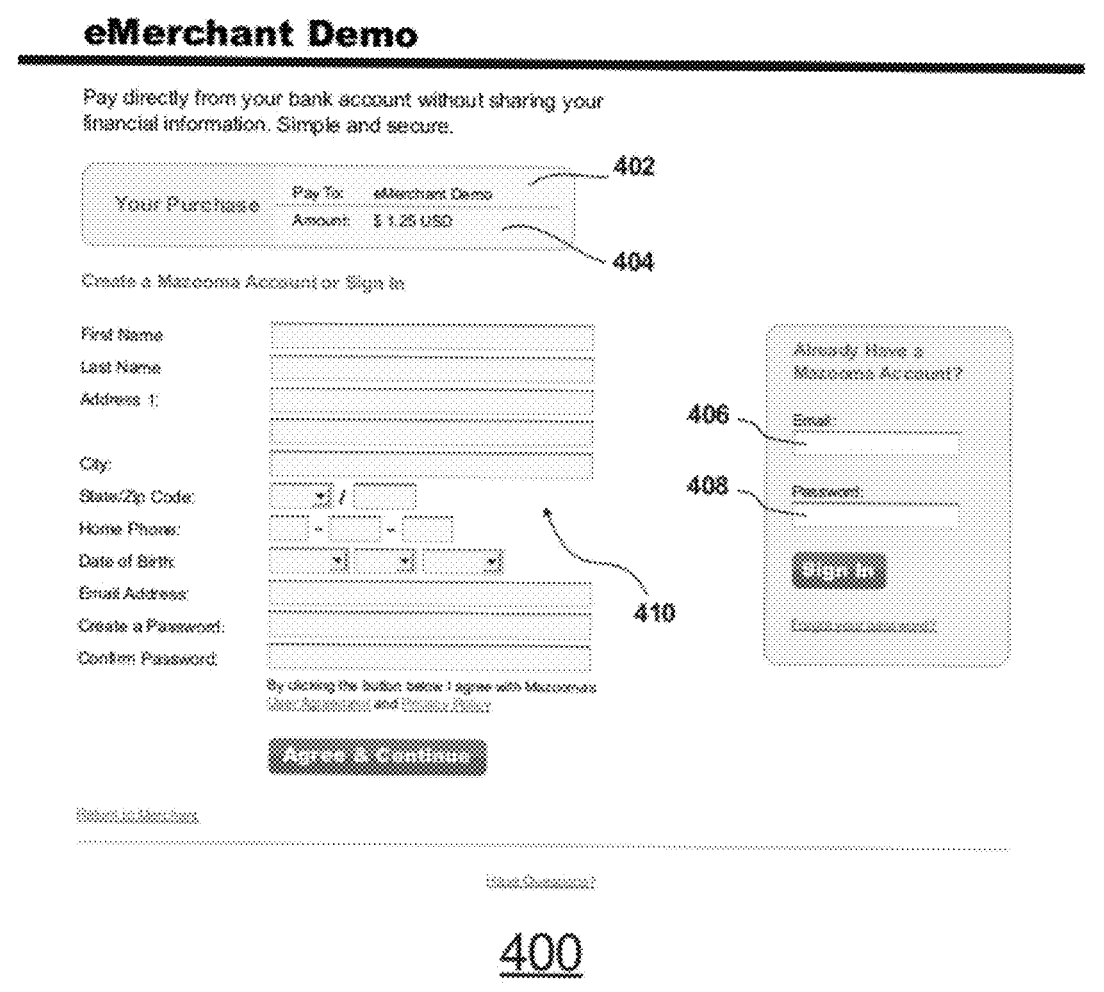

FIG. 4 shows an exemplary web page 400 provided by the ODS agent 114. The page 400 includes the transaction details 402 and 404 transmitted to the ODS server 108 from the merchant server 104. Not all transaction details are necessarily shown on the page 400. In step 312, the consumer logs onto the ODS agent 114. For logging in, the page 400 presents the consumer with at least two ways of identifying the consumer to the ODS agent 114. If the consumer is a returning user, he or she can log in with a previously-established user name or email address 406 and password 408. If this is the consumer's first time accessing the ODS agent 114, the consumer is able to create a new account by filling in the user information fields 410. In one embodiment of the present invention, the ODS agent 114 by default or by a consumer's instruction, does not store the consumer's log in information. This feature provides an added layer of security, so that the consumer does not have to worry about his/her private information being obtained by a third party.

Alternatively, the consumer's personal information can be provided to the ODS server 108 by the merchant server 104. In one embodiment, as a security measure, the ODS agent 114 asks for the same information and compares it to that submitted by the merchant server 104. If a difference in the two sets of information is detected, the transaction may be declined.

Once the consumer has identified himself A page, such as page 500 shown in FIG. 5, is presented to the consumer. Page 500 features a selection of financial institutions 502. The financial institutions can be banks or other entities where the consumer has established an account. The financial institutions may be a place that the consumer has stored money or can be an entity that extends credit to the consumer.

In step 314, the consumer selects one of the financial institutions (if more than one is offered) from the list of available financial institutions 502 and indicates his selection by clicking on the "next" or other similar button 504. The ODS agent 114, in step 315, determines whether the selected financial institution is supported by the ODS agent 114 and any associated system in which the ODS agent 114 is employed. If the financial institution is not supported, the flow moves to step 358 where an error page is presented to the consumer indicating that the transaction is not going to be processed through the ODS agent 114. An indication of the failed transaction is also sent to the merchant 104 in step 356 and the process ends at step 360. Alternatively, if the financial institution is supported, the flow moves from step 315 to step 316.

In step 316, the ODS agent 114 determines the information required by the selected financial institution for gaining access to the consumer's account at that institution and then presents a financial-institution log-in information page, such as page 600, to the consumer. The page 600 requests the necessary authentication credentials from the consumer. In one embodiment, the page requests, in a first field 602, the consumer's identifying information and, in a second field 604, a password. After hitting a "next," or other similar button 606, the information contained in the fields 602 and 604 is submitted to the specified financial institution in step 318.

In step 320, the ODS agent 114 determines whether or not the financial institution 106 requires "multi-factor" authentication. Multi-factor authentication is a relatively-new procedure for ensuring the person accessing the account has permission to do so. One example of multi-factor authentication is where a user selects a particular graphic at some point when setting up the account. During the log-in, the consumer is given a choice of graphics and, only upon making the correct selection of graphics, is he granted access to the account. In other systems, the consumer is given one or more challenge questions to answer.

If the answer to step 320 is yes, the process moves to step 322 where the ODS agent 114 presents the multi-factor authentication to the consumer. The consumer presents the answer and, in step 324, the ODS agent 114 submits the consumer's answers to the financial institution 106.

In step 326 the ODS agent 114 interprets the response from the financial institution and determines whether the authentication credentials are valid and accepted by the financial institution. If the credentials are not accepted by the financial institution the customer returns to Step 316 to correct the authentication credentials. If customer is unable to enter correct authentication credentials the transaction will not proceed. If the authentication credentials are accepted by the financial institution the process proceeds to Step 328.

In step 328, the ODS agent 114 acts on behalf of the consumer and maintains a session with the financial institution 106 in order to interact and respond to actions and messages from the financial institution 106. In other words, the ODS agent 114 implements and maintains programmatically all steps required to interact with a bank's on-line financial services to facilitate a funds transfer. Specifically, the ODS agent 114 performs all the actions and functions that would be otherwise undertaken by the consumer. The process involves significant two-way communication between the ODS agent 114 and the financial institution 106. Advantageously, this process is invisible to the consumer. The consumer only provides their authentication credentials to the ODS agent 114 and all other actions are handled by the agent 114.

This is significantly different from a proxy-server-type of interaction between a consumer and a bank site, whereby the server is merely a conduit that passes information to and from the consumer but does not act on behalf of the consumer or interpret the messages and screen code on the bank site.

Advantageously, the on-line financial institution 106 does not recognize the difference between interacting with a consumer directly and interacting with the ODS agent 114. This is not simply a matter of pre-populating fields or amalgamating steps for the consumer—it is an active agent that is undertaking steps completely independent of any interaction from the consumer. For example, the ODS agent 114, in step 328, performs functions, such as entering and submitting information, reacting to messages or pages loading on the bank site, and opening and closing the authenticated session with the bank server. The agent 114 acts independently based on a pre-determined set of steps and interactions necessary to complete a bill pay or other payment on behalf of the consumer. The complexity of accomplishing this interaction is significant given the fact that each bank site may have different authentication procedures, information requirements, session maintenance systems, protocols, and data entry sequences. The ODS agent 114 also interprets and decodes unique pages from each bank site to determine the result and appropriate response.

One advantage of the ODS agent 114 is that it does not require a system level integration with the financial institution server. "System level integration" can be described as entailing communication between two independent systems based on an agreed upon set of communication parameters and protocols. In a "system level integration" both systems conform to a common communication protocol which defines how the systems exchange data and authenticate each other. It requires participation and cooperation from both sides and also the complete and formal consent of both parties. The parameters and protocol are generally defined in a technical document called an Application Programming Interface or "API." The ODS agent 114 of the present invention is advantageous in that it does not require this integration with the financial institution. In fact, unlike currently-available systems, the present invention requires no pre-transaction communication with a financial institution. The ODS agent 114 works as an extension of the consumer and relieves the consumer from all or virtually all post-identification transaction steps. As a result, the ODS agent 114 is able to communicate with non-integrated (no previous relationship or correspondence is necessary) financial institutions.

In step 330, the ODS agent 114 determines whether sufficient funds are in the consumer's account. It does this by comparing the account balance at the financial institution to the requested fund withdraw amount. If sufficient funds to cover the transaction amount are not in the account, the flow moves to step 358 where an error page is presented to the consumer indicating that the transaction is not going to be processed through the ODS agent 114. An indication of the failed transaction is also sent to the merchant 104 in step 356 and the process ends at step 360. Alternatively, if sufficient funds to cover the transaction amount are in the account, the ODS agent 114 will present an approval page to the consumer, in step 332, such as page 700 for example. The consumer can then, in step 334, approve the transaction. In one embodiment, the consumer's approval is indicated by the selection of a button 702.

If the consumer does not approve the transaction, the flow moves to step 358 where an error page is presented, indicating that the transaction is not going to be processed through the ODS agent 114. An indication of the failed transaction is also sent to the merchant 104 in step 356 and the process ends at step 360.

If, in step 334, the consumer approves the transaction, the flow moves to step 336 where the ODS agent 114 will interact with the financial institution 106 and determine the most efficient funds transfer method available from the financial institution 106. In step 338, the ODS agent 114 initiates the funds transfer through the funds transfer method determined in step 336. Before continuing, however, in step 340 the ODS agent 114 determines whether or not the payee has previously been registered with the funds transfer channel. If not, the flow moves to step 342, where the payee is registered.

If the answer to step 340 is yes, or after the payee is registered in step 342, the flow moves to step 344 where the correct payor bank account is determined. This step is used where the payor has multiple accounts to select from, such as checking, savings, money market, and others. Once the account is selected, the flow moves to step 346 where the payment amount is provided to the financial institution 106. In step 348, the fund transfer is completed.

In step 350, the ODS agent 114 will interpret the financial institution's responses to determine the successful processing of the transaction. If the payment is not accepted by the financial institution 106, the flow moves to step 358 where an error page is presented to the consumer indicating that the transaction is not going to be processed. An indication of the failed transaction is also sent to the merchant 104 in step 356 and the process ends at step 360. If the payment is accepted by the financial institution 106, a summary page 800, such as that shown in FIG. 8, is presented to the consumer in Step 352. The summary page details the transaction and provides the consumer with a record of the transaction. This step is, of course, optional. The summary page 800 can also be emailed to the consumer using an email address that the consumer provided during the log-in process. In step 354 the customer is presented with payment receipt page. Then, in step 356, notification of the successful transaction is sent to the merchant 104 and the process ends at step 360.

In one embodiment of the present invention, the payment from the financial institution 106 to the merchant 104 is through a settlement network 116, shown in FIG. 1. A settlement network is a system that processes and pays electronic debits and credits between two or more entities. Advantageously, the present invention is "Settlement Network Independent" and is not reliant on any specific settlement network. Instead, the system is designed to leverage any one of a number of settlement networks—such as an Automated Clearing House (ACH), FedWire, account to account transfers, and others. Fedwire is a Real Time Gross Settlement Funds Transfer system operated by the Federal Reserve Banks that enables financial institutions to electronically transfer funds between its more than 8,900 participants. In conjunction with the privately held Clearing House Interbank Payments System (CHIPS), Fedwire is the primary United States network for large-value or time-critical domestic and international payments, and is designed to be highly resilient and redundant. The average daily value of transfers over the Fedwire Funds Service is approximately 2.3 trillion dollars and the daily average number of payments is about 532,000. FedWire is advantageous as it provides faster settlement than ACH (overnight vs. 3-day) and is a guaranteed payment.

As stated above, in step 338 the ODS agent 114 initiates the most efficient funds transfer on behalf of the consumer. It should be noted that the term "funds transfer," as used herein, is not an actual movement of currency, but can be an electronic credit or debit instruction transmitted over any communication channel. In certain embodiments of the present invention, the funds will settle through the settlement network 116 to an intermediate account managed by the ODS agent 114 or directly to the merchant bank account or any other account as specified by the system. Any other funds settlement method is also within the scope of the invention. It is envisioned that some settlement networks or systems that can be utilized to carry out the present invention are not entirely electronic and may not be a single entity. Instead, these alternate settlement networks can involve a plurality of networks or systems and entities. In one embodiment of the present invention, the settlement through the funds settlement network 116 works on a "net settlement basis," meaning that each financial institution aggregates its payments and refunds to arrive at a net amount.

Figure 9:
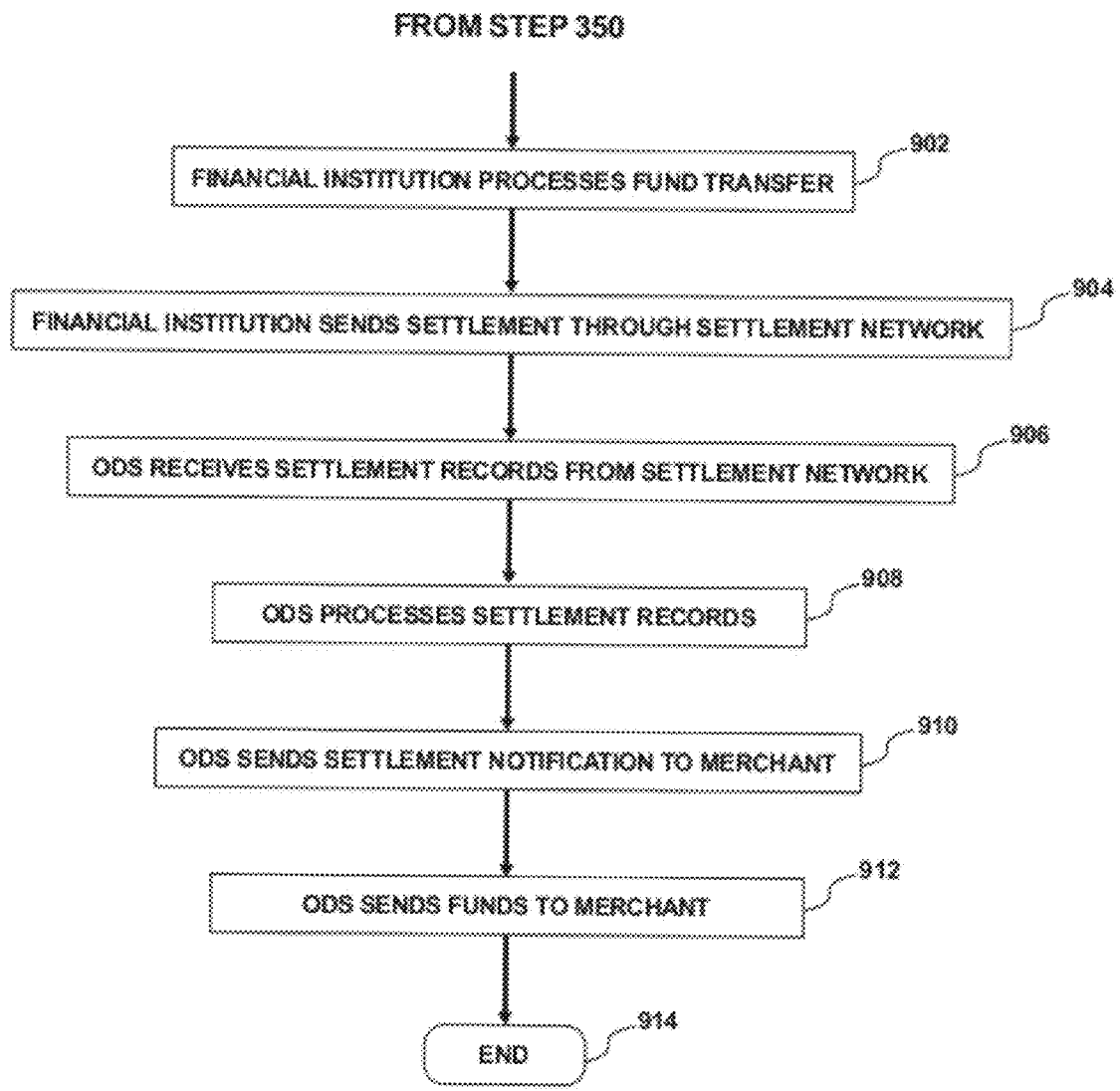
FIG. 9 is a process flow diagram showing a process for completing a settlement process in accordance with an exemplary embodiment of the present invention.

FIG. 9 shows the steps performed in step 352 of FIG. 3. FIG. 9 starts at step 902, where the financial institution 106 processes the funds transfer. In step 904, the financial institution 106 sends the settlement through the settlement network 116 and the ODS agent 114 receives a record of the settlement from the settlement network 116 in step 906. In one embodiment, the settlement file details all transactions (debits and refunds). The settlement file can be parsed and used to reconcile the transactions recorded on the ODS server 108 with those in the funds settlement network 116. Settled transaction may be returned by the customer's financial institution due to exceptional circumstances, such as charge backs or others. The returns can be deducted from future payments to the merchant 104. In step 908, the ODS agent 114 processes the settlement records.

In one embodiment of the present invention, in step 910 the ODS agent may send settlement notification to merchant which may include fund transfers that have been voided, reversed, returned or settled.

In one embodiment of the present invention, whereby funds are settled to the ODS agent's designated "intermediary" bank account(s), in step 912 the funds are pushed, i.e., caused to transfer, to the merchant's account, for example, through use of FedWire, ACH, or other method, which will withdraw money from the ODS agent's designated "intermediary" bank account(s). The funds may include net settled fund transfers less fees, reserves, returns, reversals and other deductions. The intermediary bank account is independent and can be any account at any bank. In this step, the ODS agent 114 pushes the funds in the ODS's intermediate account to the merchant 104 or any account or entity that the merchant designates. The process ends at step 914.

Figure 7:
FIG. 7 is an exemplary ODS purchase approval screen in accordance with an embodiment of the present invention.

Importantly, the presently inventive ODS agent 114 does not maintain any funds balance on behalf of the consumer. Many on-line systems that refer to themselves as "real time debit" systems are actually simply debiting funds that have already been deposited and cleared into a "virtual wallet" held by that service. Conversely, the present invention is a real-time, or quasi-real-time, debit system where, upon selection of the approval button 702 of the screen shown in FIG. 7, or other similar selection measures, the ODS agent 114, in step 338, initiates the most efficient funds transfer method on behalf of the customer directly from the consumer's bank account. In other words, the payment is from the financial institution and in the amount of the purchase. The consumer is not required to fund an account, other than the target bank account held at the financial institution, prior to the transaction.

The ODS server 108 also includes a message center 118, which is responsible for transmitting messages to merchants upon important events. In particular, the message center 118 can transmit payment results when a payment is completed by a consumer at the ODS server 108 and settlement records when a payment reversal settlement is received from a financial institution.

The ODS server 108 further includes a reporting center 120 that provides real-time or quasi-real-time reports through the internet 112 to merchants 104 on the payment, settlement, and distribution of transactions. The reporting system 120 also supplies a service that allows the merchant 104 to access key reports programmatically, for example, through an API, without human intervention.

Conclusion

The present invention, as has just been described, is advantageous in that it is an "intelligent agent" rather than a simple proxy or conduit. This means that the ODS agent 114 does not require user intervention for each step in the interaction with the financial institution 106. The intelligent agent 114 automatically executes most of the steps required to complete the funds transfer process. As an agent, the present invention does not require the bank site (financial institution 106) to integrate with the ODS agent 114. In other words, there is no need for a pre-transaction relationship to be established between the financial institution 106 and the ODS agent 114. The system is also bank independent; there is no "system level" or dependent integration with any bank or any specific financial system. In other words, the present invention can work with any on-line banking site. Because the system is not dependent on any "system level" integration or communication scheme or protocol, i.e. no direct system level integration, the ODS agent 114 can take advantage of any current or future on-line banking functionality. The invention is clearing-network independent, providing the ability and flexibility to leverage whatever clearing network is available or most efficient. The invention is also advantageous because the transaction is closed loop, meaning that the merchant receives real-time notification of the success or failure of the transaction. Also, there is no need for the consumer to fund an intermediary account, as is required in the prior art. Additionally, the consumer does not take on any debt during the transaction. Advantageously, the consumer doesn't need to provide credit card or other sensitive financial information to the merchant; the consumer only provides sensitive information to a single entity that is consistent throughout all transactions, regardless of the various merchant selected. The system provides to merchants a real-time or quasi-real-time "financial institution authenticated" transaction, ensuring that the customer has access to the bank account being used.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A device for conducting a secure transaction over a network, the device comprising:
   at least one network connection communicatively coupled to at least one network device; and
   a processor communicatively coupled to the at least one network connection, the processor operable to:
      receive, over the at least one network connection, a price, an identifier of a merchant, and a transaction identifier, the transaction identifier identifying a selection made by a user and the identifier of a merchant identifying a merchant:
         offering the selection made by the user; and
         not operating the processor;
      receive from a user, over the at least one network connection, a selection of a non-integrated financial institution from a list including at least one nonintegrated financial institution;
      receive, over the at least one network connection, a financial-institution user-identifier from the user;
      communicate, over the at least one network connection, the financial-institution user-identifier to the selected non-integrated financial institution;
      participate, over the at least one network connection, in a user-free electronic dialogue with the selected non-integrated financial institution, the dialogue including a request to transfer funds from the selected non-integrated financial institution; and direct the funds from the selected non-integrated financial institution to at least one target account.

2. The device according to claim 1, further comprising:

an agent operable to conduct the user-free electronic dialogue by automatically performing substantially all steps for electronic communication with the selected nonintegrated financial institution to access an account associated with the user.

3. The device according to claim 1, wherein the processor is further operable to:

identify receipt of the funds from the selected non-integrated financial institution into an intermediate account prior to being directed to the at least one target account.

4. The device according to claim 3, wherein the directing the funds to the at least one target account comprises:

pushing the funds from the intermediate account to an account identified by a merchant associated with the transaction identifier.

5. The device according to claim 4, wherein the pushing the funds from the intermediate account to the merchant associated with the transaction identifier comprises:

aggregating at least two transactions into a net settlement amount owed to the merchant; and pushing the net settlement amount from the intermediate account to the at least one target account.

6. The device according to claim 1, wherein the processor is further operable to:

communicate, over the at least one network connection, a payee identifier and the transaction identifier to the selected non-integrated financial institution.

7. The device according to claim 1, wherein the processor is further operable to:

receive, over the at least one network connection, a financial-institution passcode from the user; and communicate, over the at least one network connection, the financial-institution pass-code to the selected non-integrated financial institution.

8. The device according to claim 1, wherein the list includes at least one integrated financial institution.

9. A method for conducting a secure transaction over a network, the method comprising:

receiving a purchase selection at a merchant site;

communicating a transaction identifier, an identifier of a merchant, and a purchase price from the merchant site to a debit agent residing on a network processing and communication device, the identifier of a merchant identifying a merchant:

offering the purchase selection; and not operating the debit agent;

receiving at the debit agent a selection of a non-integrated financial institution selected from a list that includes at least one non-integrated financial institution;

receiving at the debit agent a financial-institution user-identifier from a user;

communicating the financial-institution user-identifier from the debit agent to the selected non-integrated financial institution;

participating in a user-free electronic dialogue between the debit agent and the selected non-integrated financial institution, the dialogue including a request to transfer funds from the selected non-integrated financial institution; and transferring with the debit agent the funds from the selected non-integrated financial institution to at least one target account.

10. The method according to claim 9, further comprising:

conducting the user-free electronic dialogue by automatically performing substantially all steps for electronic communication with the selected non-integrated financial institution to access an account associated with the user.

11. The method according to claim 9, wherein the transferring the funds to the at least one target account comprises:

receiving into an intermediate account the funds from the selected non-integrated financial institution; and pushing the funds from the intermediate account to an account identified by a merchant associated with the merchant site.

12. The method according to claim 11, wherein the pushing the funds from the intermediate account to an account identified by a merchant associated with the merchant site comprises:

aggregating at least two transactions into a net settlement amount owed to the merchant; and pushing the net settlement amount from the intermediate account to the at least one target account.

13. The method according to claim 9, further comprising:

communicating, over the at least one network connection, a payee identifier and the transaction identifier to the selected non-integrated financial institution.

14. The method according to claim 9, further comprising:

receiving, over the at least one network connection, a financial-institution passcode from the user; and communicating, over the at least one network connection, the financial-institution pass-code to the selected non-integrated financial institution.

15. The device according to claim 9, wherein the list includes at least one integrated financial institution.

16. A device for conducting a secure transaction over a network, the device comprising:

an input operable to:

receive a price, a merchant identifier, and a transaction identifier, the transaction identifier identifying a purchase selection made by a user and the merchant identifier identifying a merchant:

offering the purchase selection made by the user; and not operating the device;

receive a selection of a non-integrated financial-institution from the user; and receive a financial-institution user-identifier from the user;

a processor communicatively coupled to the input, the processor operable to:

initiate and maintain a user-free communication session with the selected non-integrated financial institution; and an output operable to:

communicate the financial-institution user-identifier to the selected non-integrated financial institution;

communicate to the selected financial institution a request to transfer funds; and communicate to the selected non-integrated financial institution an identifier of at least one target account for receiving the funds.

17. The device according to claim 16, wherein the at least one target account is an account specified by a merchant issuing the transaction identifier identifying the purchase selection made by the user.

18. The device according to claim 16, wherein the at least one target account is a settlement account maintained by an entity separate from the selected non-integrated financial institution and a merchant issuing the transaction identifier identifying the purchase selection made by the user.

19. The device according to claim 16, wherein the processor is further operable to:
   facilitate an agent that automatically performs substantially all steps of the user-free communication session with the selected non-integrated financial institution to gain access to an account associated with the user.

20. The device according to claim 16, wherein the processor is further operable to:
   initiate a funds transfer from the at least one target account to an account specified by a merchant issuing the transaction identifier identifying the purchase selection made by the user.

* * * * *